Jan. 13, 1948.   H. A. M. WINTER   2,434,477
MANUFACTURE OF MOLDED ARTICLES HAVING DIFFERENTLY
SHADED ZONES THEREIN FROM MOLDING POWDERS
Filed June 27, 1944   3 Sheets-Sheet 1
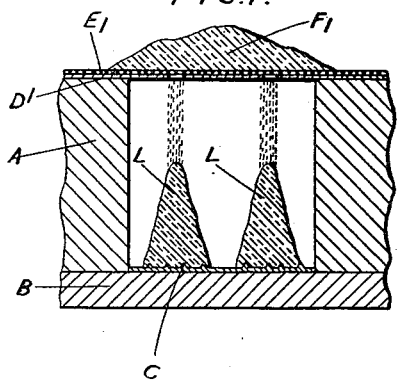
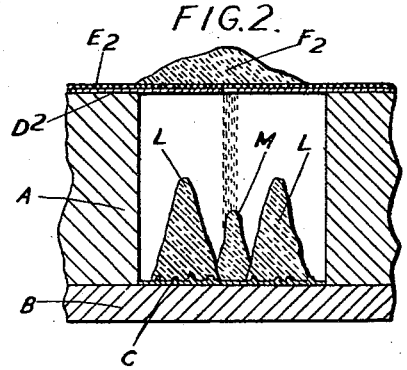
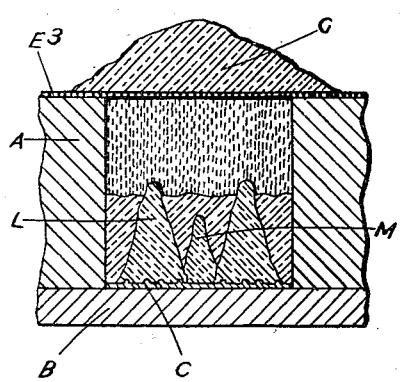
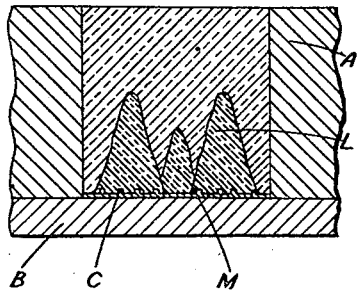
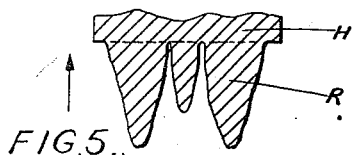
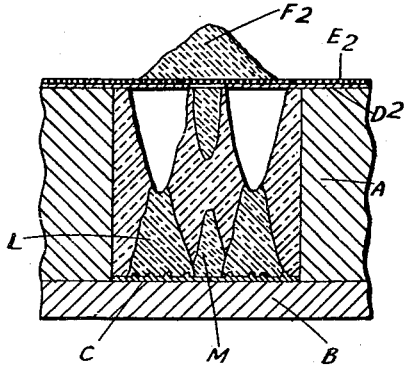
Inventor
H. A. M. Winter
By
Bailey, Stephens & Huettig
Attorney Jan. 13, 1948. H. A. M. WINTER 2,434,477
MANUFACTURE OF MOLDED ARTICLES HAVING DIFFERENTLY
SHADED ZONES THEREIN FROM MOLDING POWDERS
Filed June 27, 1944 3 Sheets-Sheet 2

Inventor
H. A. M. Winter
By
Bailey Stephens & Huettig
Attorney

Jan. 13, 1948. H. A. M. WINTER 2,434,477
MANUFACTURE OF MOLDED ARTICLES HAVING DIFFERENTLY
SHADED ZONES THEREIN FROM MOLDING POWDERS
Filed June 27, 1944 3 Sheets-Sheet 3

Inventor
H. A. M. Winter
By
Bailey, Stephens & Huettig
Attorney

Patented Jan. 13, 1948

2,434,477

UNITED STATES PATENT OFFICE 2,434,477

MANUFACTURE OF MOULDED ARTICLES HAVING DIFFERENTLY SHADED ZONES THEREIN FROM MOULDING POWDERS

Hugo Adolf Maria Winter, Maryport, England, assignor to Messrs. Hornflowa Limited, Maryport, England, a British company Application June 27, 1944, Serial No. 542,370
In Great Britain July 7, 1943

11 Claims. (Cl. 18—48.8)

This invention relates to the manufacture of moulded articles from moulding powders so that the articles may present differences of structure and grain or the like which are reproducible at will. The invention is particularly useful in the production of buttons and ornamental articles or materials moulded to represent horn and other natural products which are desired to present differences of colour as well as a natural grain or structure corresponding to the annual rings in horn. The invention is not limited, however, to this particular use, and it includes the production of moulded articles of any shape or size having the characteristics of texture and pattern such as are indicated above.

It is well known in the manufacture of moulded objects to impress a pattern on a soft sheet or tablet of material and then to fill in the pattern with a differently coloured material before pressing and moulding articles therefrom. The present invention differs from such proposals in that the material is filled into the mould in the form of a powder, and the texture of the material is determined by the manner in which the powder is introduced prior to moulding, although a surface pattern may be added to form graining or the like on the surface of a partly moulded product made from the powder in order to take a differently coloured material which will show up the graining or the like after the final moulding operation.

In carrying the invention into effect differently coloured powders are fed into moulds through stencils, the powders being supplied through a fine sieve or screen which can be vibrated over the stencils so as to deposit the powder in little heaps in the bottom of each mould, each heap corresponding with one of the holes in the stencil. Differently coloured powders can be introduced in successive operations with different stencils over each mould, each heap corresponding to a differently coloured zone in the product. Another powder to form the body of the article is then introduced by a shaking sieve or screen to fill up the mould cavity around the heaps of coloured powders without substantially disturbing these heaps. The mould may be filled with the powder at this stage. Then if the pattern corresponding with the differently coloured zones in the body is to be made to appear extending through the moulded article from back to front, a press member with projections upon it corresponding to the patterns of the stencils is pressed lightly into each mould so as to make a depression in the body material over each of the heaps of differently coloured powder in the mould. The mould is then passed under the original stencils, or duplicates of these stencils, and the coloured powders are fed in by shaking sieves to fill the depressions in the body powder left by the projections on the press member. When this has been done a plunger is brought down in the mould to compress the powder mass, and this is heated sufficiently to cause the particles to cohere to form a partially moulded tablet. If at the start of the operation the bottom of the mould has a relief surface in it corresponding with the graining or the like in the finished product, this graining will appear in the partially formed tablet pressed in the mould. The tablet is then removed and placed in another mould in an inverted position with the graining surface uppermost, and the lines or marks of the graining are filled in with a differently coloured powder. The bottom of this mould may be curved or rounded to correspond with the back of the button or other article to be formed, and a top plate may be applied to form the upper surface of the moulded article. A second moulding is then effected by heat and pressure, preferably by forcing up a plunger from below so that the upper grained surface of the article is pressed into the stationary mould surface having the contour of the top of the article. The heaps of differently coloured material form zones of different texture in the body of the article which are substantially continuous through the moulded product, while the graining in general only appears on the upper surface where it will be noticeable.

The second moulding operation gives a tablet which has the desired shape and surface pattern permanently applied to it at each side, and it only requires a final moulding in a finishing mould to produce the finished article. After the second moulding operation the tablet has a more or less glazed surface and can be freely handled and stored without risk of spoiling its surface pattern and graining or the like. The second moulding might give the finished article in some cases, but this is preferably effected separately in a different type of mould.

The method described enables fine effects of pattern and colouring to be obtained which it has not been possible to produce by methods hitherto practised. This is due to the gradual building up of the differently coloured heaps or zones of powder and their setting in the tablet by the moulding operations, together with the setting of the powders in the lines of graining or the like pressed into the surface in the first moulding operation.

The invention is illustrated in the accompanying drawings in which the various figures illustrate the successive steps in the moulding of a button or similar article.

In Figure 1, A is the body of the mould with a bottom plate B having a relief pattern at C thereon corresponding to the graining or surface texture of the desired product. Over the top of the mould is laid a stencil D1 having holes therein in predetermined positions, and over this again is a gauze or screen E1 supplied with a coloured powered material F1. When the screen E1 is shaken the powder falls only through the holes in the stencil to form heaps of powder L on the bottom of the mold or on the relief pattern C thereof, each heap corresponding with one or more of the holes in the stencil.

Figure 2 shows the next stage, in which another stencil D2 is placed over the mould and another gauze screen E2 with a differently coloured powder F3 thereon is shaken over the stencil so as to make one or more heaps of material as at M which may be different in size or height from the heaps L.

Figure 3 shows the next stage, in which a gauze or screen E3 carrying the powdered body material G is placed over the mould and shaken so as to fill up with the body powder the space around the heaps L and M and the rest of the mould cavity, preferably up to the top.

In the next stage indicated in Figure 4 a press member H is brought down over the mould, this member having projections R on its lower surface corresponding with the holes in the stencils D1 and D2 or rather with the heaps of material deposited through the holes in the stencils.

Figure 5 shows the result of this pressing operation, projections R on the press member H having pressed the powder G aside so as to make depressions in this powder over each of the heaps L and M respectively.

Figure 7:
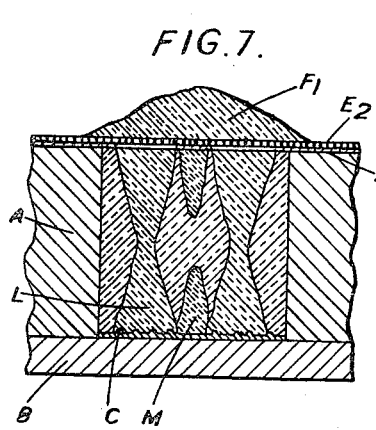

In Figure 6 the stencil D2 has been placed over the mould again and the powder F2 from the screen E2 applied to fill the cavity in the top corresponding with the heap of material M below. Similarly in Figure 7 the stencil D1 has been replaced and the powder F1 from the screen E1 dusted into the mould to fill the cavities corresponding with the heaps at L therein.

Figure 8:
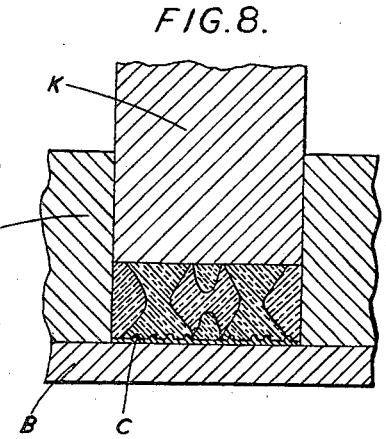

In the next stage illustrated in Figure 8 the powders in the mould are partially compressed by bringing down the plunger K which may be heated if required so as to compress and partially solidify the material to form a partly moulded tablet. When this is removed from the mould the tablet has the form shown in Figure 9.

Figure 10:
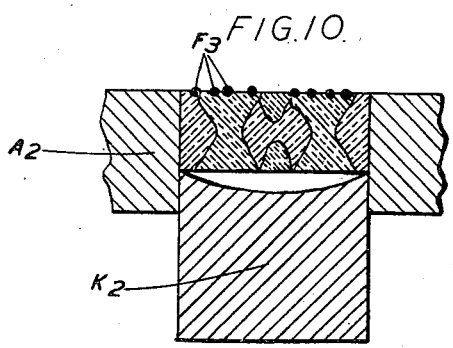

Figure 10 shows the next stage in which the tablet is inverted and placed in another mould A2 with a plunger K2 therein, the top of which may have the shape of the back of the button or the like article to be formed. The graining in the tablet will now be in the top thereof, and this is filled by applying a powder F3 of differently coloured material sufficient to show up the lines or marks in the grained surface when pressed.

Figure 11:
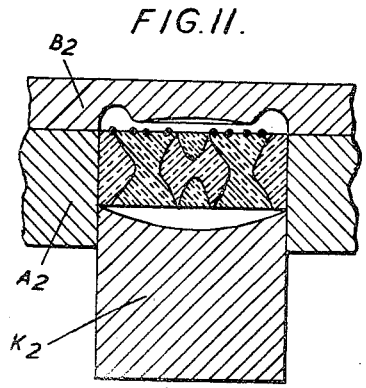
Figure 12:

In the next operation shown in Figure 11, a top B2 is applied to the mould A2 having the configuration of the top surface of the article such as a button to be formed. A second pressing operation is then effected by forcing up the plunger K2, using the necessary heat and pressure to cause the setting of the mould powders in the form of the desired tablet such as that for a button, as indicated in Figure 12.

It will be understood of course that the disposition of the heaps L and M is only indicated diagrammatically, and these may be distributed in varying sizes over the area of the mould so as to form any dark zones of various shapes in an otherwise lighter coloured body material or vice-versa. The depressions formed by the press member H with its projections R need not be of the same depth as the height of the heaps L and M first made in the mould, but they should generally correspond in position so that the pattern of the differently coloured zones may appear to be continuous through the body of the moulded article. The moulding powders used will generally be more or less translucent, particularly in the case of the body powder G, so as to give the impression of natural horn or the like. Moulding powders for this purpose are known, made from powdered horns and hooves of animals mixed with artificial resins such as those made from urea and formaldehyde, and these, when suitably coloured, may provide the several powders for use according to this invention.

By the method hereinbefore described it is found possible to deposit the powders through the stencils in sharply defined piles corresponding to the shape of the holes in the stencils, the stencils and the moulds being stationary while only the sieve is vibrated to cause the powder to pass through the stencil. In the drawings the thicknesses are exaggerated in order to show the form clearly.

Figure 9:
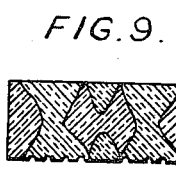

If it is desired that graining or a similar surface pattern shall appear on both faces of an article it is only necessary that the lines of the graining should be formed as a relief pattern on the plunger K of the press shown in Figure 8, the recesses so formed being filled with powder when the tablet, as in Figure 9, is inserted in an inverted position in the mould of Figure 10.

Figure 13:
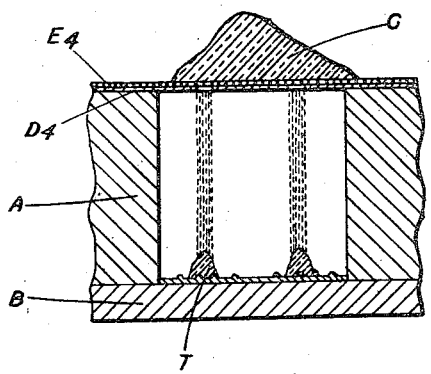
Figure 14:
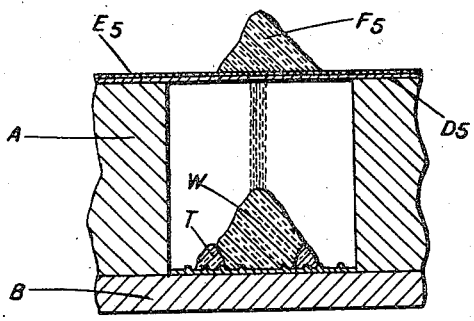
Figure 15:
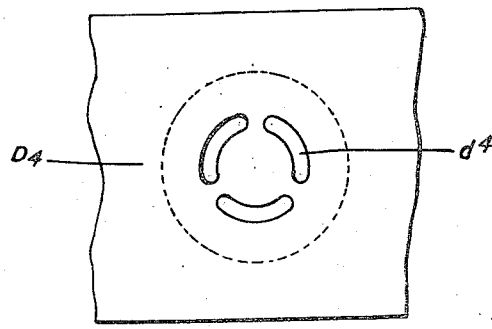

Another effect which can be obtained is that of producing an article with a light-coloured centre such as is formed in an object cut from a horn tip, the colour increasing in intensity from the centre toward the circumference. Figures 13 to 15 illustrate how this result is attained. In Figure 13 the stencil D4 and a sieve E4 are used with a mass of powder G. The stencil D4 has slots $d^4$ in it, as seen in plan in Figure 15, and the powder G on passing through it makes a ring such as T in the bottom of the mould. In the next stage shown in Figure 14 a white or light coloured powder F5 is used, dusted in through a stencil D5 from screen E5 so as to form a heap W within the ring T, with its edges thinning out in such a way that when the body powder is filled in as in Figure 3, followed by pressing as in Figure 4, and the other successive operations up to that of Figure 9, or Figure 12, a tablet is obtained wherein the pattern of a body cut from a horn tip is very closely reproduced.

If the operation carried out according to Figures 1 to 12, if the coloured powder F1 is a light and transparent brown, while the powder F2 is darker, the zone M formed by the darker powder will show through the overlapping zone formed by the heap L, giving a natural shading effect in the body of the article.

The mould shown in Figures 1 to 8 may be stationary, a row of moulds being provided over which stencils and screens carrying moulding powder are moving in steps so as to deal with the charges in a large number of moulds simultaneously. For example, if the stencils and screens in Figure 1 are moved one step to the left so as to bring the stencils and screens of Figure 2 into action, while the screen of Figure 3 comes into action in a second step, and the press member of Figure 4 in a third step, the motions can be reversed after lifting the press member as in Figure 5 so as to bring the screen and stencil of Figure 2 into action again in Figure 6, and the screen and stencil of Figure 1 into action in Figure 7, followed by the pressing by plunger K as in Figure 8. The stencils are not necessarily of the same form for each mould in a row, and a set of different stencils and different press members H may be used, one for each button or moulded member in the row.

Press tools of the multi-cavity type may be used, the number of cavities in each tool depending upon the size of the tablets to be formed. In making tablets for buttons I have used successfully in experiments moulds having up to 140 cavities each, which adapts the process very well for mass production.

Although a mixture of ground horn and an artificial resin have been mentioned as a suitable material for the moulded articles, any other mouldable powdered materials may be used which are capable of setting under heat and pressure. The moulded articles may be of any shape, and an article prepared in a tableted form, as in Figure 9 may be distorted into a variety of other forms in the second moulding of Figures 10 and 11.

I claim:

1. A process for the production of moulded articles with differently shaded zones therein, consisting in feeding mouldable powdered material into a mould through perforations in a stencil so as to form discrete heaps of powder on the base of the mould, filling the space around and over such heaps while still in an uncompressed state with a mouldable powdered body material of a different shade, forming depressions in the said body material by means of a press member with projections thereon, filling the depressions so formed with further mouldable powdered material of another shade from that of said powdered body material, compressing the product to a tablet form, and moulding it to a solid body under heat and pressure.

2. A process for the production of moulded articles with differently shaded zones therein, consisting in feeding mouldable powdered material into a mould through perforations in a stencil so as to form discrete heaps of powder on the base of the mould, filling the space around and over such heaps while still in an uncompressed state with a mouldable powdered body material of a different shade, forming depressions in the said body material by means of a press member with projections thereon, corresponding in position with said heaps of material first deposited in said mould, filling the depressions so formed with further mouldable powdered material of another shade from that of said powdered body material, compressing the product to a tablet form, and moulding it to a solid body under heat and pressure.

3. Process for the production of moulded articles with differently shaded zones therein, consisting in feeding mouldable powdered material into a mould through perforations in a stencil so as to form discrete heaps of powder on the base of the mould, adding further discrete heaps of differently shaded mouldable powdered material through another stencil, filling the space around and over all such heaps while still in an uncompressed state of material with a differently shaded mouldable powdered body material, forming depressions in said body material by means of a press member with projections thereon corresponding in position with said heaps of material deposited in the mould, filling in mouldable powdered material differing in shade from said body material through corresponding stencils into the depressions so formed, compressing the product to a tablet form, and moulding it to a solid body under heat and pressure.

4. Process for the production of moulded articles with differently shaded zones therein, and with a grained appearance on one face thereof, consisting in using a mould the base of which has ribs on its surface corresponding to the grained pattern desired, feeding mouldable powdered material into said mould through perforations in a stencil so as to form discrete heaps of powder on the base of the said mould, filling the space around and over such heaps while still in an uncompressed state with a mouldable powdered body material of a different shade, forming depressions in said body material by means of a press member having projections thereon, filling the depressions so formed with further mouldable powdered material of another shade from that of said powdered body material, compressing the product to a body of tablet form in said mould, removing said body from said mould and placing it in inverted position in another mould, filling with a material of another shade the grooves in the surface of said body which are now uppermost and which were formed by the ribs on the base of said first mentioned mould, and finally moulding said body by heat and pressure to a solid form.

5. Process for the production of moulded articles with differently shaded zones therein and with a grained appearance on one face thereof, consisting in using a mould whose base has ribs on its surface corresponding to the pattern of the graining desired, feeding mouldable powdered material of different shades through holes in a plurality of different stencils successively into said mould so as to form discrete heaps of differently shaded powdered material on the base of said mould, filling the space around and over said heaps while still in an uncompressed state with a mouldable powdered body material of a different shade from those of said heaps, forming depressions in said body material by means of a press having projections thereon, filling the depressions so formed with further mouldable powdered materials of the character used for forming said heaps on the base of the said mould, compressing the product to a tablet form in said mould, removing said body from said mould and placing it in inverted position in another mould, filling with a material of another shade the grooves in the surface of said body which are now uppermost and which were formed by the ribs on the base of said first mentioned mould, and finally moulding said body by heat and pressure to a solid form.

6. Process for the production of moulded articles with differently shaded zones therein, consisting in using a mould with a stencil having perforations in it disposed over the top of the mould, placing mouldable powdered material on a sieve over such stencil, causing the sieve to vibrate so as to allow discrete heaps of powdered material to be formed on the base of said mould under the perforations in said stencil, filling the space around and over such heaps while still in an uncompressed state with a mouldable powdered body material of a different shade, forming depressions in said body material by means of a press member with projections thereon, filling the depressions so formed with further mouldable powdered material of another shade from that of said powdered body material, compressing the product to a tablet form and moulding it to a solid body under heat and pressure.

7. Process for the production of mouldable articles with differently shaded zones therein and with a grained appearance on one face thereof, consisting in using a mould the base of which has ribs on its surface corresponding to the grained pattern desired, and a plurality of stencils each with perforations in it in different positions, adapted to be placed over the mould, and a sieve arranged to be vibrated over the top of each stencil, feeding mouldable powdered material of various shades through the sieve and through perforations in the stencils so as to form discrete heaps of powder of differing shades on the base of the mould, filling the space around and over such heaps while still in an uncompressed state with a mouldable powdered body material of another shade, forming depressions in said body material by means of a press member having projections thereon, filling the depressions so formed with further mouldable powdered material of a different shade from that of said body material, compressing the product to a body of tablet form in said mould, removing said body from said mould and placing it in inverted position in another mould, filling with a material of another shade the grooves in the surface of said body which are now uppermost and which were formed by the ribs on the base of said first mentioned mould, and finally moulding said body by heat and pressure to a solid form.

8. Process for the production of moulded articles with differently shaded zones extending through the same, consisting in using a mould with a stencil having perforations in it disposed over the top of the mould, feeding mouldable powdered material through perforations in the stencil so as to form discrete heaps of powder on the base of the mould, filling the space around and over such heaps while still in an uncompressed state of material with a mouldable powdered body material of a different shade, forming depressions from the top of said body material down to the heaps of material first deposited in the mould by the use of a press member having projections located in positions corresponding with the positions of the perforations in the stencil, filling the depressions so formed with more of the first mentioned powdered material fed through the same stencil, compressing the product to a tablet form, and moulding it to a solid body by heat and pressure.

9. Process for the production of moulded articles with differently shaded zones extending through the same, and with a grained appearance on one face thereof, consisting in using a mould with a base carrying ribs on its surface corresponding to the grained pattern desired, feeding mouldable powdered material into the mould through perforations in a stencil so as to form discrete heaps of powder on the base of the mould, filling the space around and over such heaps while still in an uncompressed state of material with a mouldable powdered body material of a different shade, forming depressions from the top of said body material down to the heaps of material first deposited in the mould by the use of a press member having projections located in positions corresponding with the positions of the perforations in the stencil, filling the depressions so formed with more of the first mentioned powdered material fed through the same stencil, compressing the product to a body of tablet form, removing said body from the mould and placing it in inverted position in another mould, filling with a material of another shade the grooves in the surface of the body formed by the ribs in the base of the first mentioned mould, which grooves are in the face then uppermost, and moulding the resulting body by heat and pressure to a solid form.

10. A process for forming varied colored molded articles comprising establishing in a mold at least one pile of powdered material according to the natural slope angles of said material, said material being supported only by the floor of said mold substantially filling said mold with a second colored powdered material lying in contact with said first material, indenting said second material, filling said indentations with powdered material, and then setting into a unitary structure all the material in said mold.

11. A process as in claim 10, further comprising the step of indenting said second material at least to said first material.

HUGO ADOLF MARIA WINTER.

REFERENCES CITED

The following references are of record in the file of this patent:

UNITED STATES PATENTS

| Number | Name | Date |
| --- | --- | --- |
| 229,492 | Sylvester | June 29, 1881 |
| 1,454,939 | Michaelsen | May 15, 1923 |
| 1,599,084 | Gibson | Sept. 7, 1926 |
| 2,101,540 | Gullich | Dec. 7, 1937 |
| 2,169,665 | Skolaude | Aug. 15, 1939 |
| 2,185,492 | Barrett | Jan. 2, 1940 |
| 2,208,494 | Broderson | July 16, 1940 |
| 2,244,565 | Nast | June 3, 1941 |